UNITED STATES PATENT OFFICE.

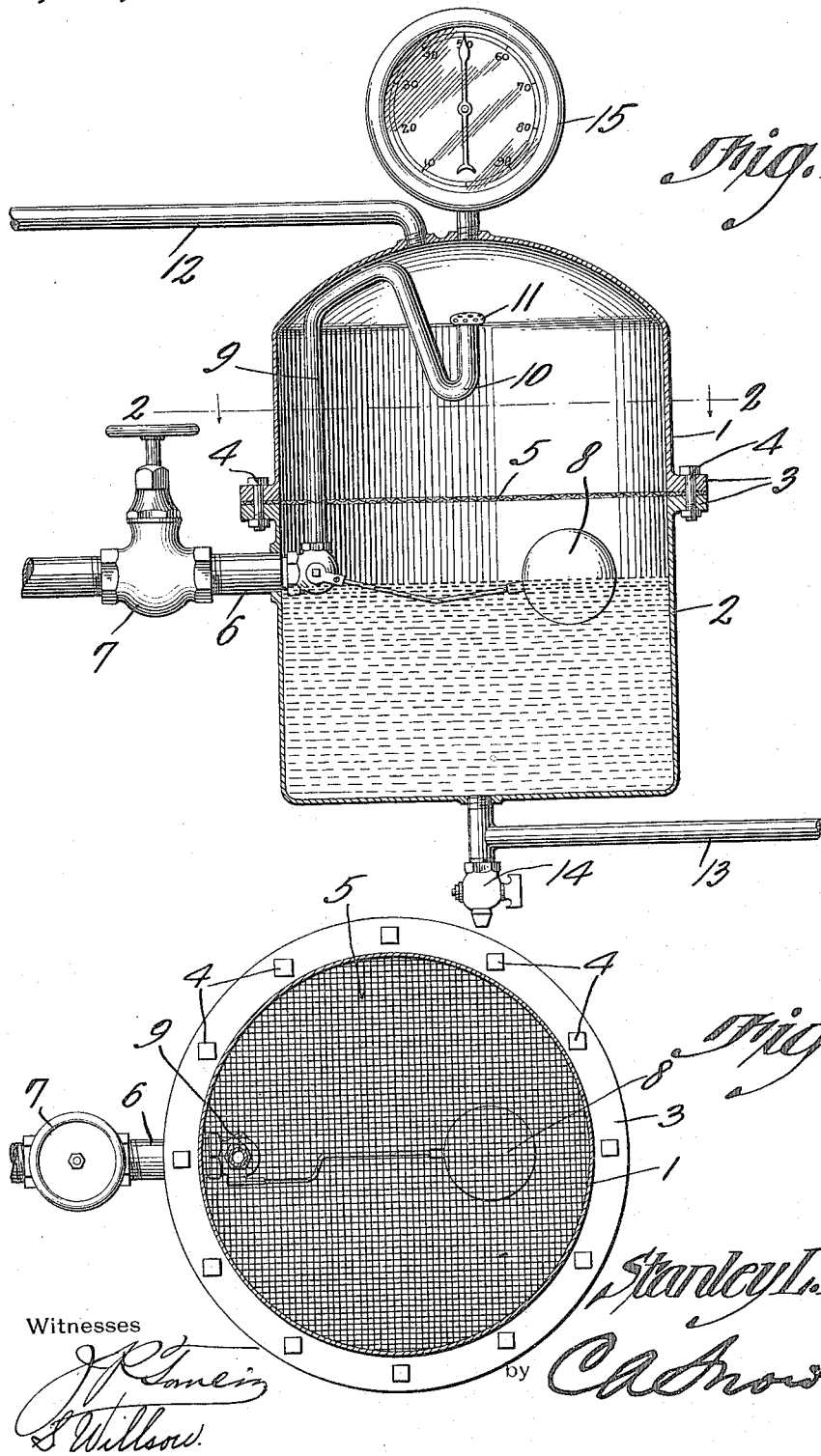

STANLEY L. BROWN, OF SPOKANE, WASHINGTON.

CARBONATOR FOR SODA-FOUNTAINS.

1,143,941. Specification of Letters Patent. Patented June 22, 1915.

Application filed August 5, 1913. Serial No. 783,177.

*To all whom it may concern:*

Be it known that I, STANLEY L. BROWN, a citizen of the United States, residing at Spokane, in the county of Spokane and State of Washington, have invented a new and useful Carbonator for Soda-Fountains, of which the following is a specification.

My invention relates to new and useful improvements in a carbonator for soda fountains and has for its primary object the provision of a device of this character in which the water and carbonic acid gas are thoroughly mixed.

A further object of the invention is the provision of a device in which the water can be supplied from the city main or other suitable supply.

A still further object is the arrangement of the water inlet in such relation to the carbonic acid gas inlet that they will mix by spraying one into the other.

With these and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawing:—Figure 1 is a vertical sectional view partly in elevation. Fig. 2 is a horizontal section on the line 2—2 of Fig. 1.

In carrying out the invention I provide a tank formed in two sections 1 and 2 each of said sections being provided with the flanges 3 through which the bolts 4 pass for securing the sections together. A screen 5 is secured in the tank by being held between the flanges 3 of the tank. Water is supplied to the tank by means of the supply pipe 6 to which is secured a cut off valve 7. The supply pipe 6 enters the tank preferably below the screen 5 and a valve is secured on the end of the pipe 6 and is controlled by the float 8. An extension 9 leads from the supply pipe 6 and as clearly shown in the drawings extends to a point near the top of the tank when it is bent downward and then upward to form the trap 10. A spraying nozzle 11 is secured on the top of the extension and sprays the water in all directions. The carbonic acid gas supplied through the pipe 12 from any suitable supply and as noted the pipe enters the top of the tank above the nozzle 11 and as also shown the pipe enters at a slight angle. The pipe 13 leads from the bottom of the tank to the soda water fountain for supplying the carbonated water thereto.

The numeral 14 indicates a drain valve from the bottom of the tank. A pressure indicator of any well known construction is indicated at 15.

Having fully described the detailed construction of my device it is thought that the operation will be clear. The water entering the tank through the pipe 6 passes through the valve at the end of the pipe and then passes through the extension 9 and the trap 10 to the nozzle 11 where it is sprayed in all directions. The carbonic acid gas entering through the pipe 12 being above the nozzle 11 sprays the gas and thoroughly mixes it with the water. It then passes downward through the screen 5 and is more thoroughly mixed and then is held in the bottom of the tank until used. The float 8 controls the valve on the end of the supply pipe 6 whereby the supply of water is regulated. By constructing the trap 10 the water is always held in the pipe and prevents any of the carbonic acid gas from entering said pipe. By constructing a device in this manner it will be seen that it can be used with the ordinary city supply of water and is simple in construction and there are no parts liable to become caught or otherwise disabled.

Having thus fully described my invention, what I claim as new and desire to secure by Letters Patent is:—

A carbonating apparatus, including a tank divided into two superposed chambers by a foraminous partition, a gas supply pipe leading into the tank from the top, a carbonated water conveying pipe leading from the bottom of the tank, and a float controlled valved water supply pipe leading into the tank below the partition and having an upstanding extension projecting through the partition, the extreme upper end of the extension being disposed upwardly and having a nozzle for projecting the water in the path of the inrushing gas from the gas supply pipe.

In testimony that I claim the foregoing as my own, I have hereto affixed my signature in the presence of two witnesses.

STANLEY L. BROWN.

Witnesses:
JOHN K. McLEOD,
F. R. BURCHELL.